United States Patent [19]

Takakuwa

[11] Patent Number: 5,140,941
[45] Date of Patent: Aug. 25, 1992

[54] WATER VESSEL

[75] Inventor: Nariaki Takakuwa, Amagasaki, Japan

[73] Assignee: Daiichi Kogei Co., Ltd., Hyogo, Japan

[21] Appl. No.: 554,991

[22] Filed: Jul. 20, 1990

[30] Foreign Application Priority Data

Jul. 21, 1989 [JP] Japan .............................. 1-85990[U]

[51] Int. Cl.[5] ............................................ A01K 61/00
[52] U.S. Cl. ........................................ 119/3; 119/4
[58] Field of Search ................................ 119/2, 3, 4, 5; 114/314; 405/170, 189, 188; 285/367

[56] References Cited

U.S. PATENT DOCUMENTS

| | | | |
|---|---|---|---|
| 3,255,731 | 6/1966 | Girard | 119/3 |
| 3,398,978 | 8/1968 | Gasche | 285/367 |
| 3,464,722 | 9/1969 | Lorkin | 285/367 |
| 3,495,562 | 2/1970 | Fahlman et al. | 114/314 |
| 3,695,229 | 10/1972 | Renn | 119/4 |
| 3,797,836 | 3/1974 | Halling | 285/367 |
| 4,038,945 | 8/1977 | Tabarsky | 119/3 |
| 4,084,543 | 4/1978 | Pequegnat | 119/3 |
| 4,610,219 | 9/1986 | Morimura | 119/3 |
| 4,699,086 | 10/1987 | Mori | 119/3 |
| 4,703,719 | 11/1987 | Mori | 119/3 |
| 4,886,015 | 12/1989 | Ochs | 119/3 |

Primary Examiner—Paul J. Hirsch
Attorney, Agent, or Firm—Armstrong, Nikaido, Marmelstein, Kubovcik, & Murray

[57] ABSTRACT

A water vessel is assembled from a number of vessel units having at least one connecting opening, a short tube portion formed at each connecting opening of the vessel units, a connecting flange formed at an end of each short tube portion, and an annular packing interposed between contact surfaces of the connecting flanges of an adjacent pair of vessel units and received by annular recesses of the contact surfaces. A number of connecting members are arranged around each pair of connecting flanges of adjacent vessel units with the pair of flanges being inserted into grooves formed in the connecting members. The pair of flanges are pressed into contact by bolts for clamping the end portions of the connecting members together and utilizing wedge action between peripheral wedge portions of the pairs of flanges and groove wedge portions of the connecting members.

8 Claims, 12 Drawing Sheets

WATER VESSEL

BACKGROUND OF THE INVENTION

The present invention relates to a water vessel for breeding fishes and the like.

As for the water vessels of this kind, well known are rectangular parallelepipedic or cylindrical vessels made of transparent glass plates or synthetic resin plates.

Shapes and sizes of these vessels, however, can not be changed, but are fixed. Therefore, in order to respond to customers' needs, various shapes and sizes of water vessels must be prepared. Besides, when shapes and sizes of water vessels become necessary to be changed during the use, the whole water vessels must be replaced, resulting in much wastage.

SUMMARY OF THE INVENTION

The object of the invention is to provide a water vessel the shapes and sizes of which in its entirety can be optionally changed.

The water vessel according to the invention comprises a multiplicity of vessel units each having at least a connecting opening which is detachably connected together.

Shapes and sizes of the water vessel according to the invention can be optionally obtained by connecting a multiplicity of vessel units. Shapes and sizes of the vessel in its entirety can be optionally changed by changing the number and location of vessel units.

The vessel units are formed with short tube portions at the connecting openings, and formed with connecting flanges at the ends of the short tube portions, wherein pairs of the connecting flanges of vessel units may be connected. Thus, the vessel units can be easily connected.

Pairs of the connecting flanges of vessel units abut to each other with a packing therebetween. Around pairs of the connecting flanges arranged are a multiplicity of connecting members, which are formed with grooves, into which pairs of the connecting flanges are inserted. Pairs of the connecting flanges may be pressed into contact with each other by clamping the end portions of the connecting members together with bolts, and by utilizing the wedge action between the peripheral wedge portions of pairs of the flanges and the groove wedge portions of the connecting members.

In this way, pairs of the connecting flanges of vessel units can be tightly connected even with few bolts.

With reference to the attached drawings, the invention will be described in detail.

DETAILED DESCRIPTION OF PREFERABLE EMBODIMENTS

Figure 1:
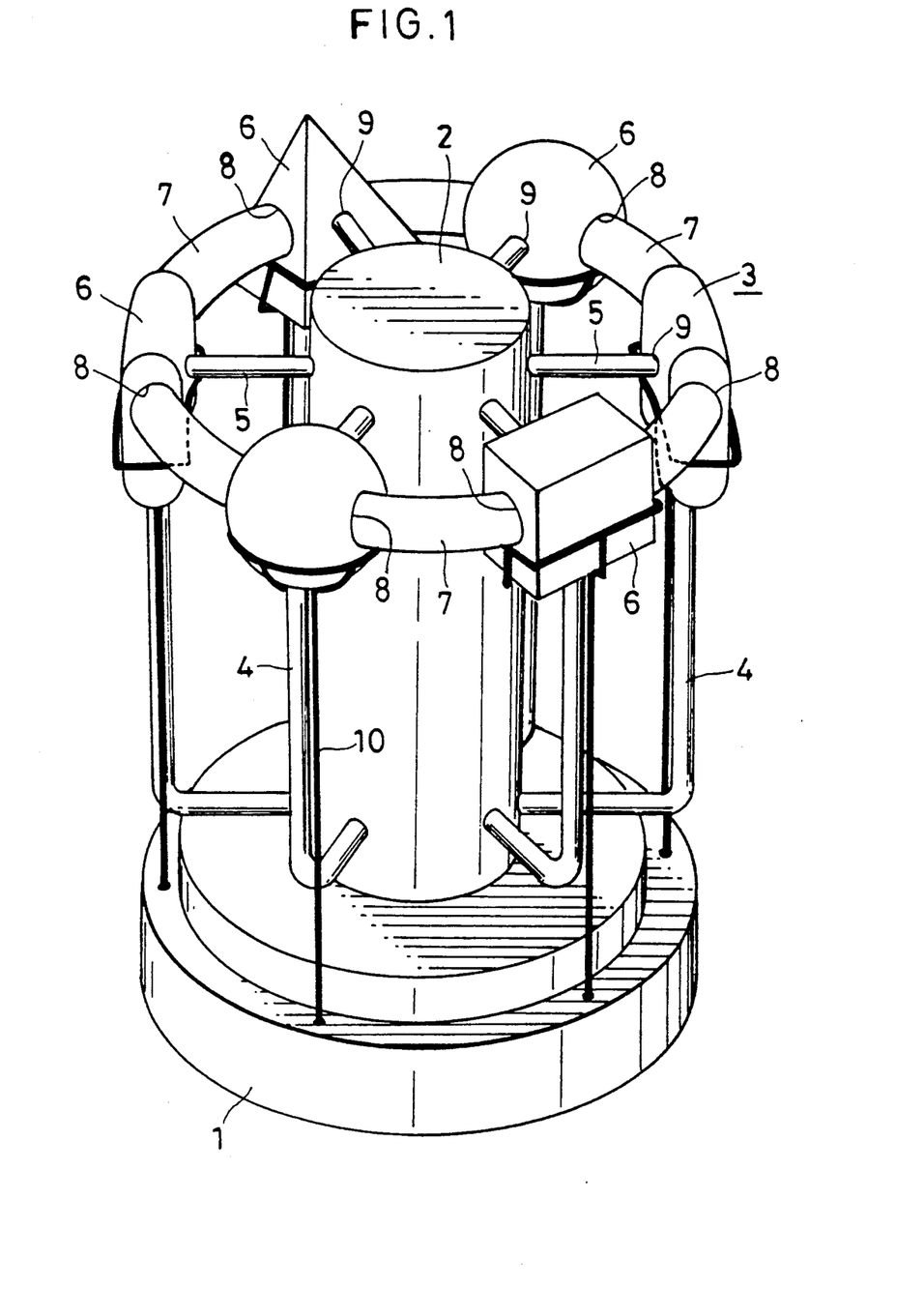
FIG. 1 is a perspective view of a first embodiment of the water vessel according to the invention.

FIG. 1 shows diagramatically the construction of the water vessel in its entirety. The vessel comprises a cylindrical filter vessel 2 above a short cylindrical base 1 and an anuular water vessel body 3 arranged around the upper portion of the filter vessel 2.

The filter vessel 2 is provided with an unillustrated pump and filter, and the pump sucks the unclean water from the water vessel body 3 through the lower suction tubes 4, and discharges the filtered clean water into the water vessel body 3 through the upper discharge tubes 5.

The water vessel body 3 consists of a multiplicity of vessel units 6 and 7. In this embodiment, spherical, rectangular parallelepipedic and triangular pyramidal vessel units 6, and curved cylindrical connecting vessel units 7 are employed. Either all these vessel units 6 and 7, or only some of them according to necessity may be transparent. Further, the transparent vessel units may be transparent either as a whole or only partly.

Each vessel unit 6 and 7 is formed with at least a connecting opening 8 which is detachably connected together. Either all these vessel units 6 and 7, or only some of them according to necessity are formed with tube connecting openings 9 in addition to the connecting opening 8. Preferably, some of the lower tube connecting openings 9 are connected with the suction tubes 4 of the filter vessel 2, and some of other tube connecting openings 9 are connected with the discharge tubes 5 of the filter vessel 2. The vessel units 6 and 7 are tightly closed except connecting opening 8 and tube connecting openings 9. When some connecting openings 8 and tube connecting openings 9 are not used, they are also tightly closed with suitable covers. Additionally, the vessel units 6 and 7 may be formed with openings for maintenance, which are tightly closed with covers.

The vessel units 6 and 7, the connecting openings 8, and the connecting means are optionally constructed. For example, the connecting openings 8 may be formed with flanges, which are fastened to each other with a packing therebetween by utilizing bolts and nuts or a one-touch clip.

The base 1 is provided with suitable supporters 10, which support suitable portions of the vessel units 6 and 7. By the way, the supporters 10 are not always necessary.

Figures 2, 3, 4, 5:
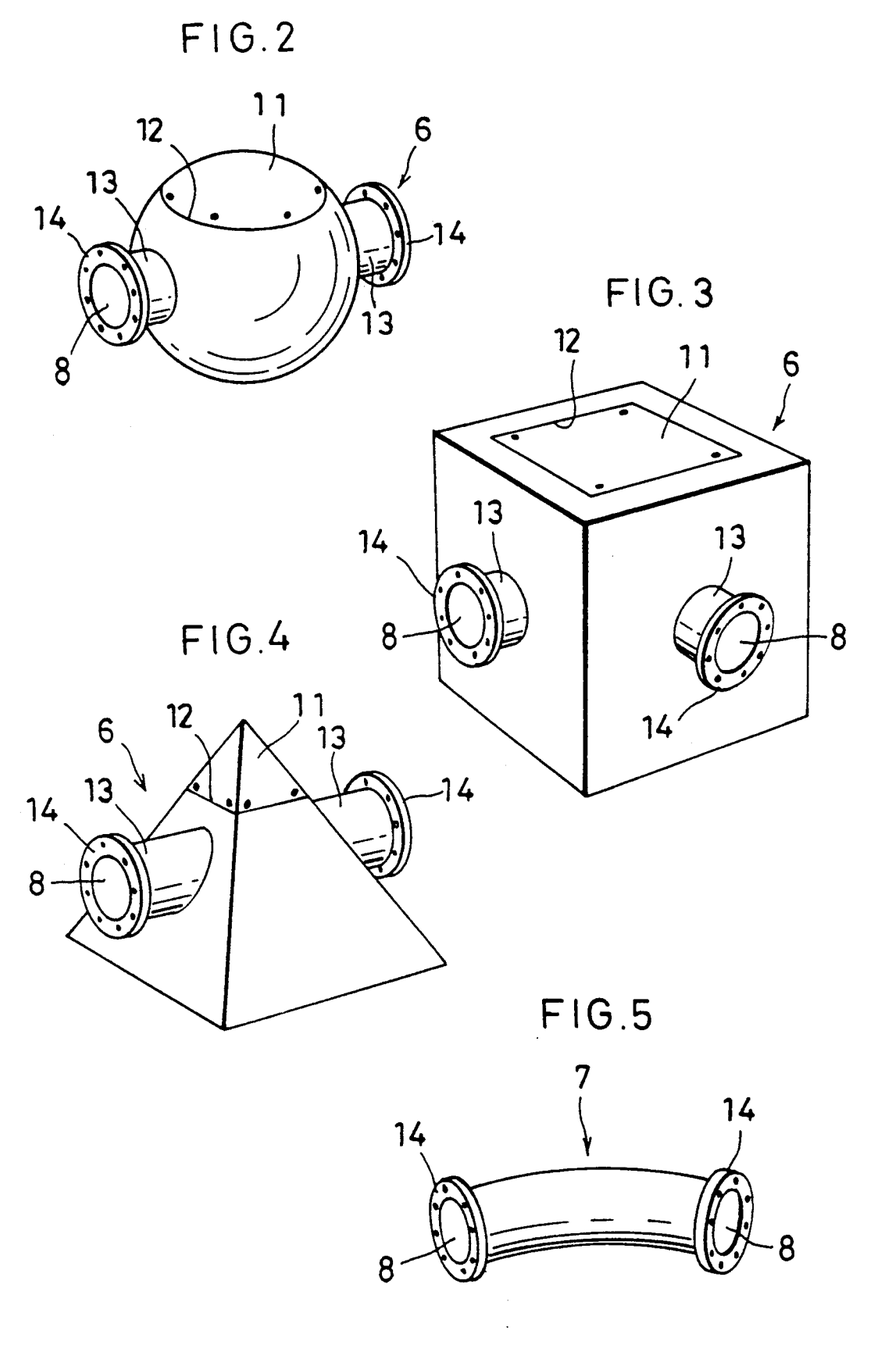
FIGS. 2 to 4 are perspective views respectively exemplifying the vessel units.
FIG. 5 is a perspective view exemplifying a connecting vessel unit.

The above-described vessel units 6 are exemplified in FIGS. 2 to 4. The connecting vessel unit 7 is exemplified in FIG. 5.

As shown in FIGS. 2 to 4, the vessel units 6 are formed with openings 12 for maintenance, which are tightly closed with covers 11. The vessel units 6 are formed with short tube portions 13 at the connecting openings 8, and formed with connecting flanges 14 at the ends of the short tube portions 13. As shown in FIG. 5, the connecting vessel unit 7 are also formed with connecting flanges 14 at the opposite connecting openings 8.

Figure 6:
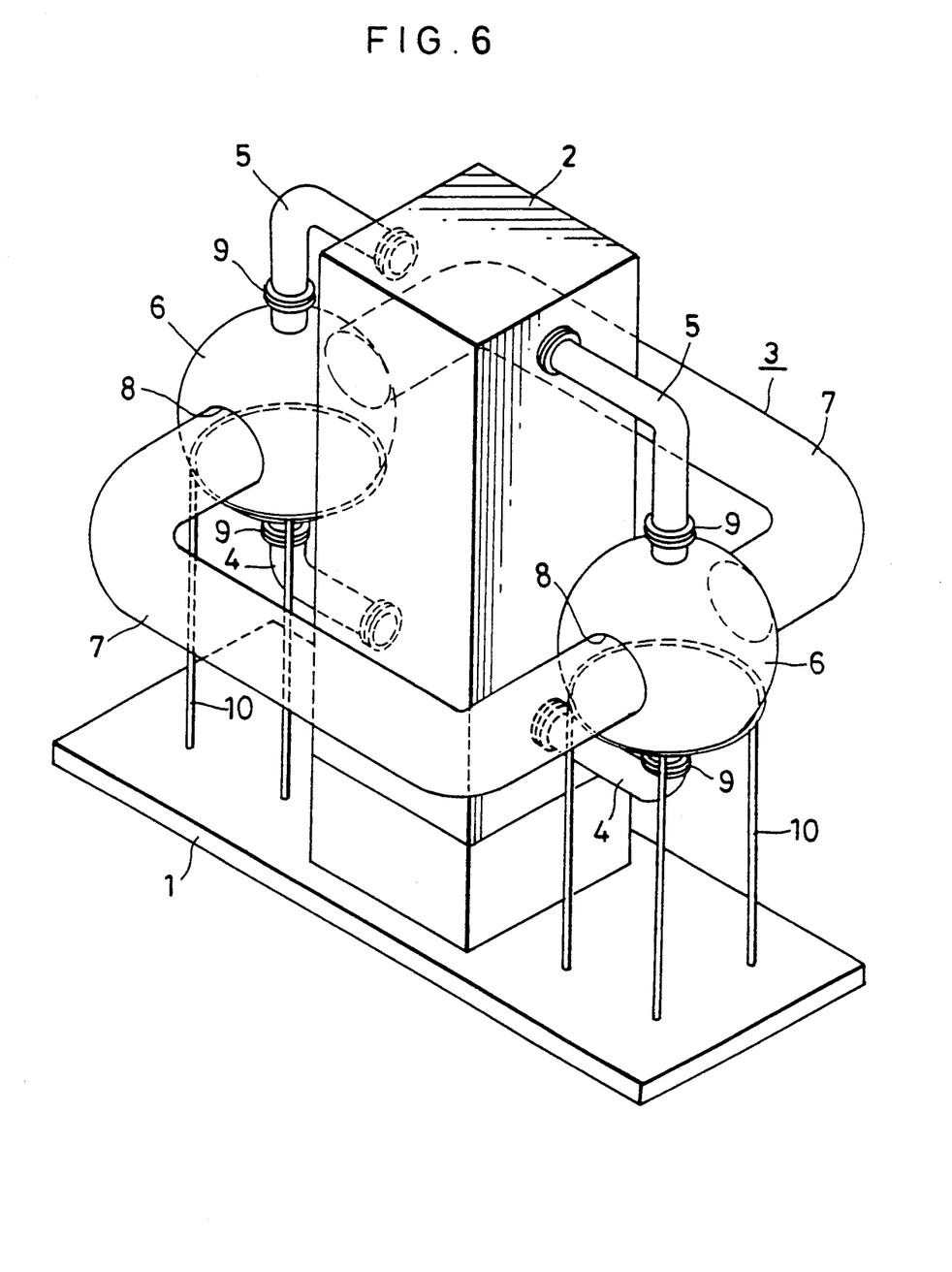
FIG. 6 is a perspective view of a second embodiment of the water vessel according to the invention.

FIG. 6 shows diagramatically the construction of another water vessel in its entirety. Throughout FIGS. 1 and 6, like parts are designated by like reference numerals. In this embodiment, the water vessel body 3 consists of a spherical vessel unit 6 and a U-shapedly bent connecting vessel unit 7 circular in cross-section.

Figure 7:
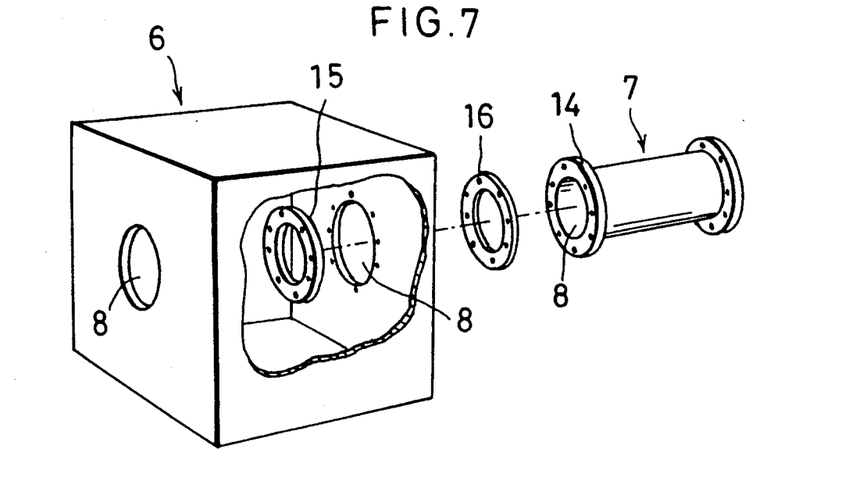
FIGS. 7 to 9 are partly broken perspective views respectively exemplifying the vessel units and the connecting vessel units.
Figure 8:
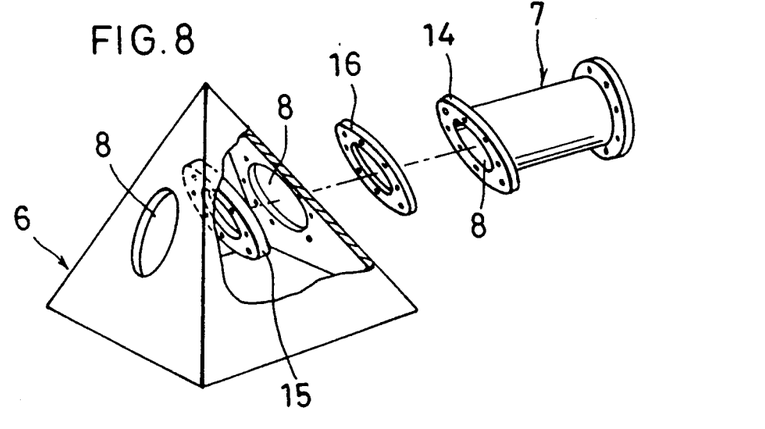
Figure 9:
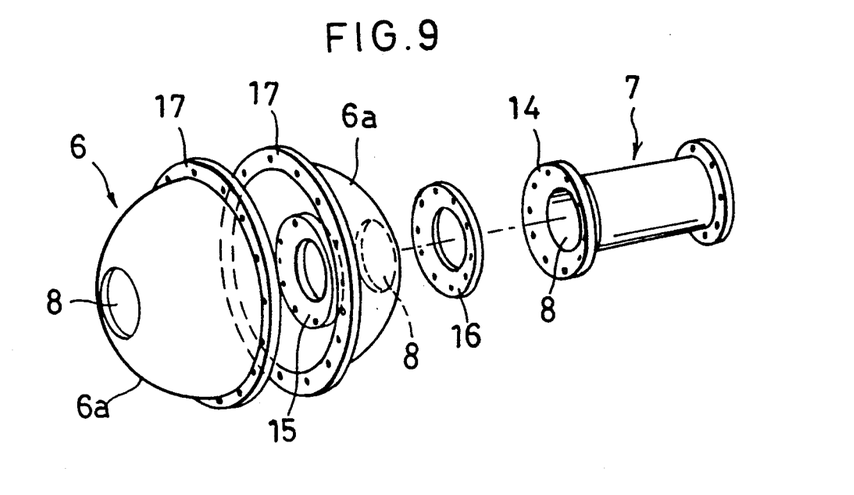

FIGS. 7 to 9 exemplify other vessel units 6 and connecting vessel units 7.

In FIG. 7, the connecting openings 8 of the vessel units 6 are simply circular holes. The connecting vessel unit 7 are cylindrical, and are formed with connecting flanges 14 at the opposite connecting openings 8. With connecting rings 15 abutted to the inside of the peripheral wall of the connecting openings 8, and also with the flanges 14 abutted to the outside of the same wall further with an anuular packing 16 sandwiched therebetween, the connecting openings 8 are water-tightly connected to each other by the ring 15, the wall of the vessel unit 6, the packing 16 and the unillustrated bolts and nuts piercing the flange 14. Further, such connecting operation can be carried out by utilizing the unillustrated opening for maintenance.

In FIG. 8, the flange 14 of the connecting opening 8 of the connecting vessel unit 7 is obliquely formed in accordance with the obliqueness of the wall of the triangular pyramidal vessel unit 6 where the connecting opening 8 is formed. Others are similar to FIG. 7, and throughout FIGS. 7 and 8, like parts are designated by like reference numerals.

In FIG. 9, the vessel unit 6 is spherically formed by connecting two semi-spherical halves 6a by utilizing peripheral flanges 17. The ring 15, the packing 16 and the flange 14 of the connecting opening 8 of the connecting vessel unit 7 are partially spherically formed in accordance with the form of the portion of the vessel unit 6 where the connecting opening 8 is formed. Others are similar to FIG. 7, and throughout FIGS. 7 and 9, like parts are designated by like reference numerals.

Figure 10:
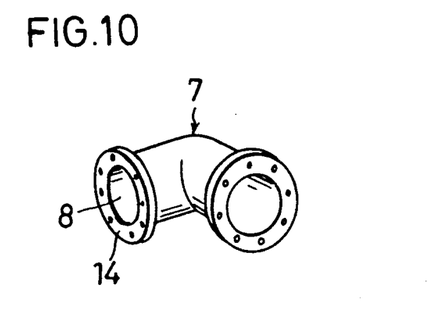
FIGS. 10 to 22 are perspective views respectively exemplifying the connecting vessel units.
Figure 11:
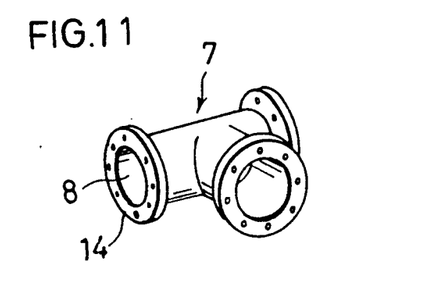
Figure 12:
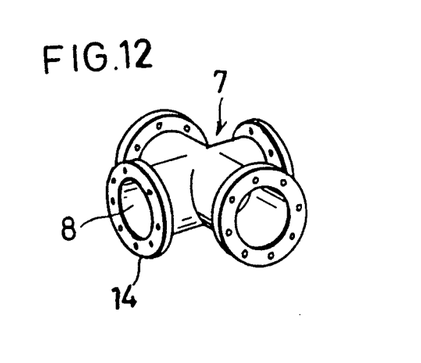
Figure 13:
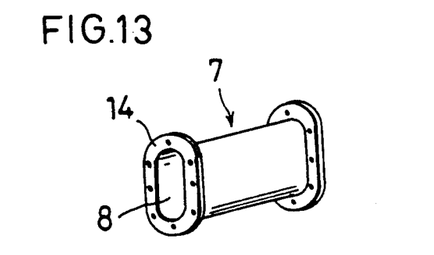
Figure 14:
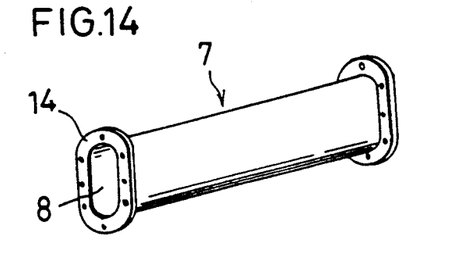
Figure 15:
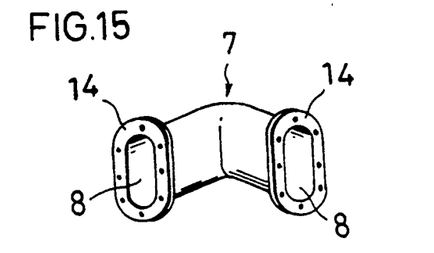
Figure 16:
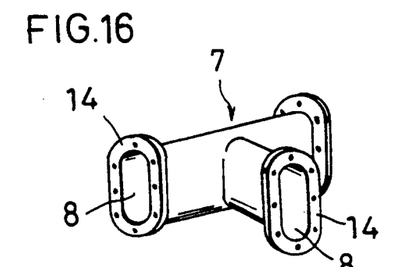
Figure 17:
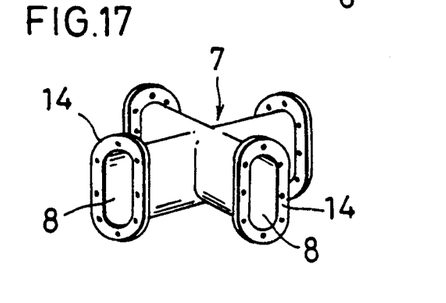
Figure 18:
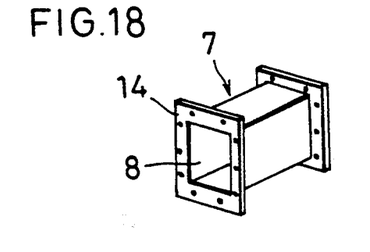
Figure 19:
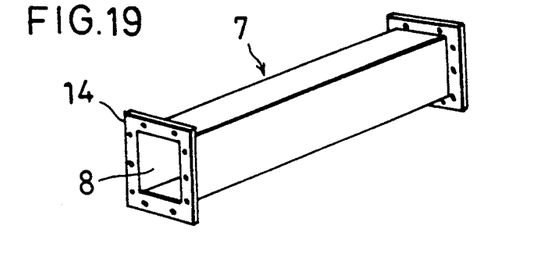
Figure 20:
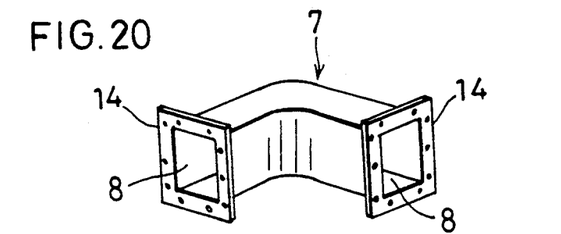
Figure 21:
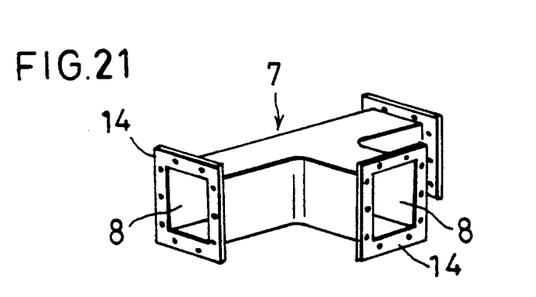
Figure 22:
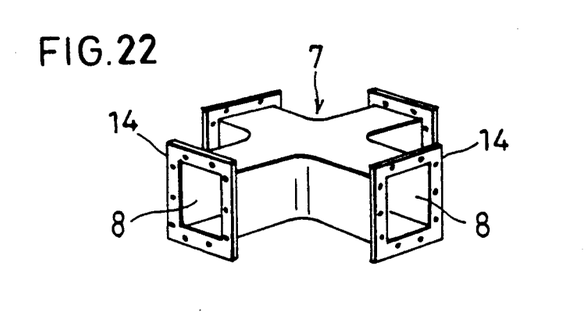

FIGS. 10 to 12 exemplify several other connecting vessel units 7, and throughout FIG. 7 and FIGS. 10 to 12, like parts are designated by like reference numerals.

FIGS. 13 to 22 exemplify further several other connecting vessel units 7, and throughout FIG. 7 and FIGS. 13 to 22, like parts are designated by like reference numerals.

The connecting vessel units 7 of FIGS. 13 to 17 are oval in cross-section, and those of FIGS. 18 to 22 are square in cross-section While the water vessels of above-described embodiments have filter vessels 2 insatlled separately from water vessel bodies 3, the vessel units 6 having built-in filter assemblies and necessary built in assemblies may be employed to consist the water vessel body.

Figure 23:
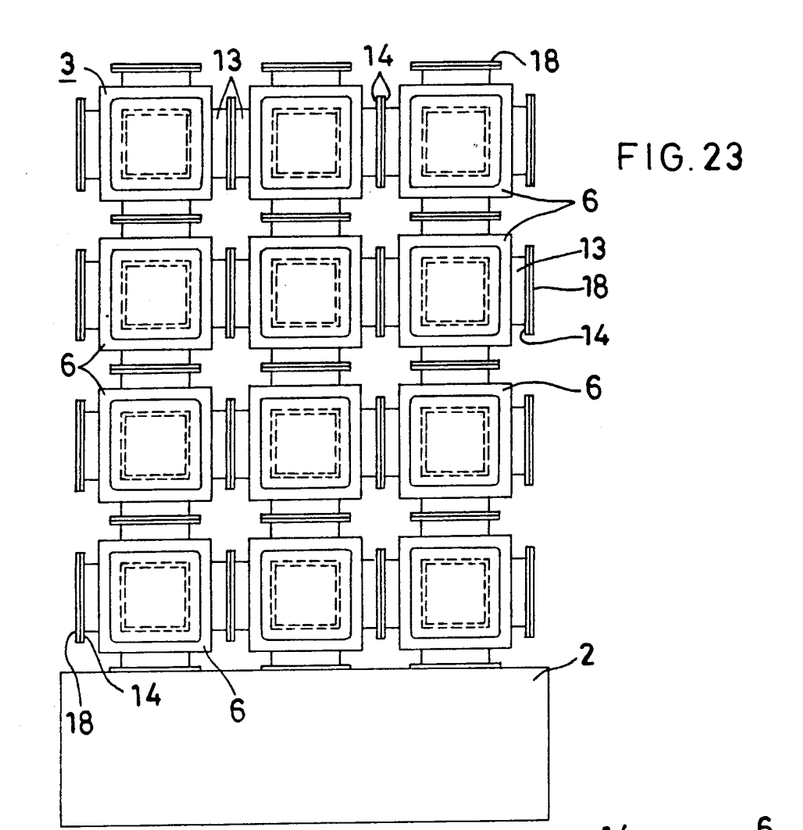
FIG. 23 is a perspective view of a third embodiment of the water vessel according to the invention.

FIG. 23 shows diagramatically the construction of further another water vessel in its entirety. Throughout FIGS. 1 and 23, like parts are designated by like reference numerals. In this embodiment, the water vessel body 3 consists of a multiplicity of only the same vessel units 6, which body is placed on the base-like filter vessel 2.

Figure 24:
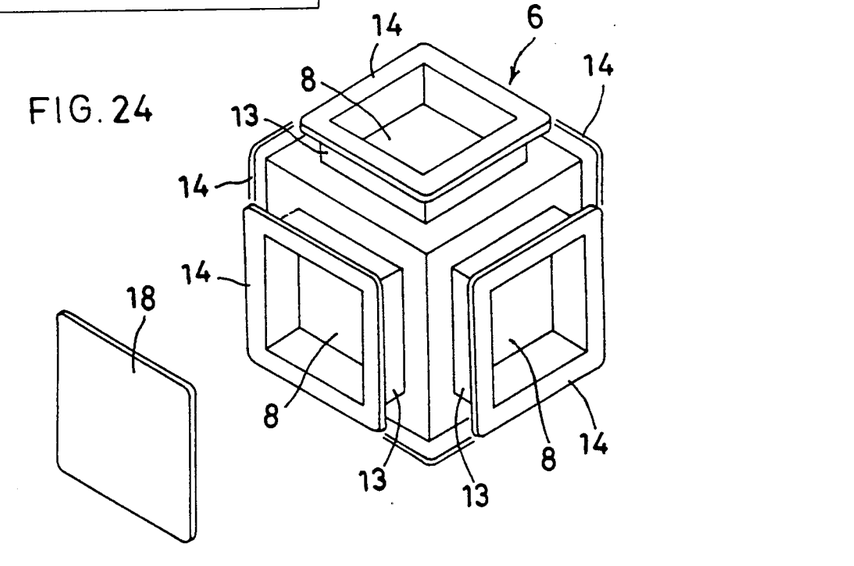
FIG. 24 is a perspective view exemplifying a disassembled water vessel and a cover.

As shown in FIG. 24, the vessel unit 6 is formed as a cube, each of all six surfaces of which is formed with a relatively great square connecting opening 8. Each connecting opening 8 is formed with the short tube portion 13, each end of which is formed with the connecting flange 14.

As viewed from the front, the vessel units 6 are arranged two-dimensionally in a vertical plane to form, for example, a rectangle, wherein the connecting flanges 14 of the vessel units 6 neighboring vertically and transversely are connected to each other. The connecting openings 8 not to be connected to other vessel units 6 are tightly closed with square plate-like covers 18 such as shown in FIG. 24.

In this embodiment, a transversely long filter vessel 2 is provided below the water vessel body 3, whereas a vertically long filter vessel may be provided at the suitable side of the water vessel body 3. Further, instead of providing separately a filter vessel, a portion of the vessel unit 6 may build-in a filter assembly, etc.

Figure 25:
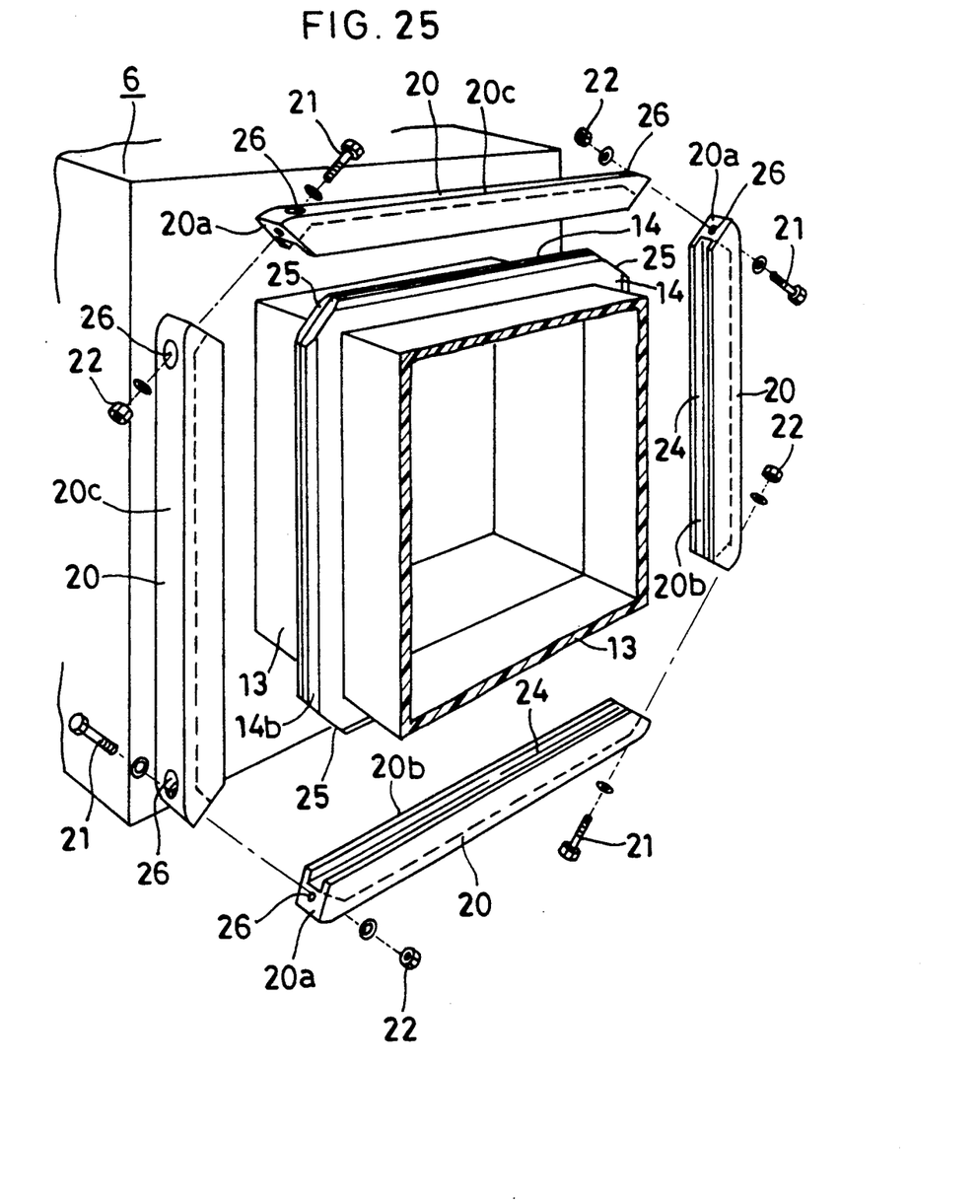
FIG. 25 is a partly broken perspective view exemplifying a connecting means for connecting vessel units.
Figure 26:
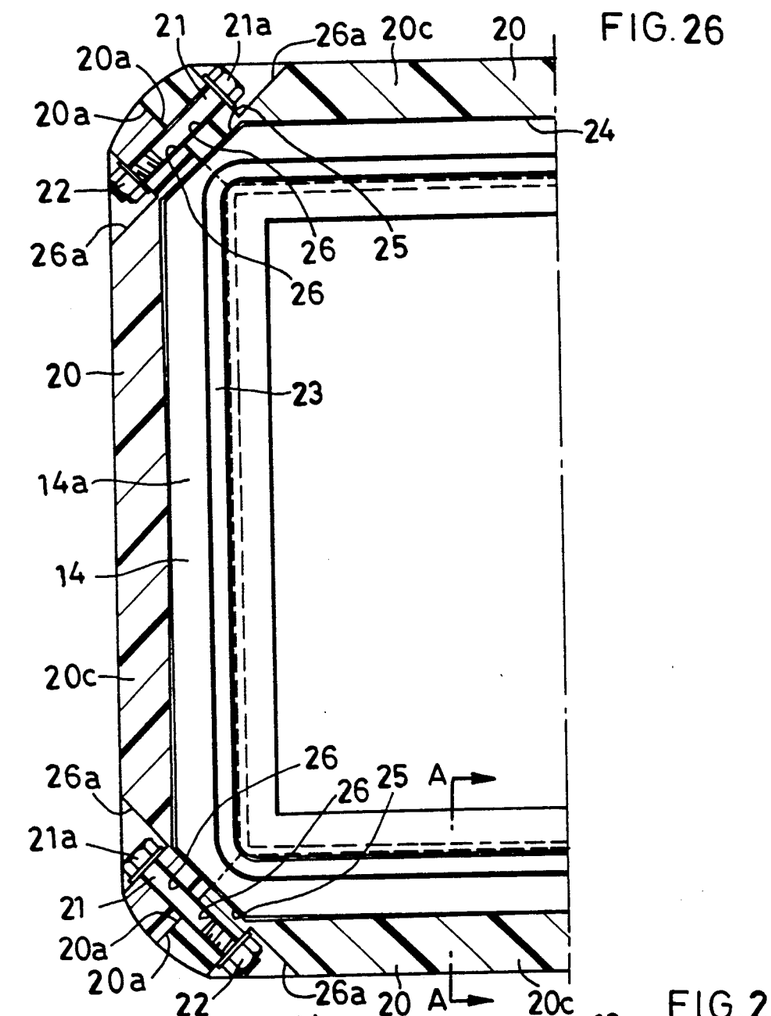
FIG. 26 is a cross sectional view of a part of the connecting portion shown in FIG. 25.
Figure 27:
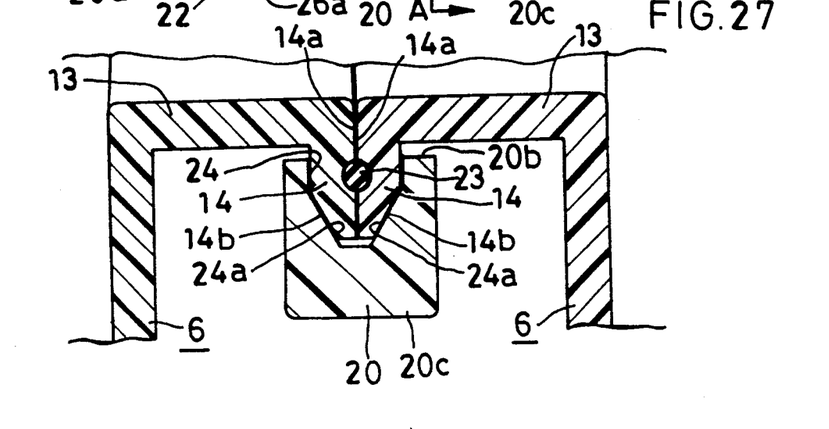
FIG. 27 is an enlarged sectional view of FIG. 26 taken along the A—A line.

FIGS. 25 to 27 exemplify a connecting means for connecting vessel units 6 such as shown in FIG. 24.

In this case, flanges 14 of the vessel units 6 are connected together with a packing 23 therebetween by utilizing four connecting members 20 and four pairs of bolts and nuts.

Pairs of the flanges 14 of vessel units 6 are abutted to each other with an anuular packing 23 between the abutting surfaces 14a. The outer peripheral portion of the surface opposite to the abutting surface 14a is formed with a wedge surface 14b sloping toward the abutting surface 14a in the direction toward the front edge, thereby forming a wedge portion—narrowing in the direction toward the front edge—at the outer peripheral portion of pairs of the abutting flanges 14. Four corners of the flanges 14 are chamfered at a 45° angle.

The connecting member 20 is a straight bar having the length substantially equal to a side of the flange 14 and having a square cross section. Its opposite ends are chamfered at 45° angles to form abutting surfaces 20a. The connecting member 20 is formed with a groove 24—for accomodating sides of the pair of abutting flanges 14—at the inside 20b. The side walls of the groove 24 at the opening side or the inside 20b are parallel to each other, and the groove width here is slightly greater than the total thickness of the pair of abutted flanges 14. The groove 24 is formed with wedge surfaces 24a so sloping that the width therebetween narrows toward the bottom in accordance with the wedge surfaces 14b of the flanges 14. The groove 24 slightly shallows at the opposite end portions in accordance with the four chamfered corners of the flanges 14. The abutting surface 20a of the connecting member 20 is formed with a bolt hole 26—piercing crosswisely thereof to the outer surface 20c—centrally thereof. The bolt hole 26 is formed with an enlarged diameter portion 26a at the outer side near the outer surface 20c.

One connecting member 20 is provided to each side of the pair of abutted flanges 14, having the flanges 14 inserted into the groove 24, and having the wedge surfaces 14b of the flanges 14 contacted with the wedge surfaces 24a of the groove 24. Pairs of the abutting surfaces 20a of the neighboring connecting members 20 are confronted, and connected by a bolt 21 and a nut 22. The bolt head 21a is fixed in the enlarged diameter portion 26a of one connecting member 20, and the nut 22 in the enlarged diameter portion 26a of the other connecting member 20. By clamping the connecting members 20 by bolts 21 and nuts 22, the two flanges 14 are pressed into contact together by the wedge action of the wedge surfaces 14b, 24b, and are water-tightly connected. The connecting member 20, in a natural state, is preferably inwardly convexed at the inside 20b so that pair of the flanges 14 are pressed into contact together with almost uniform force over the whole periphery, when the opposite ends of the connecting members 20 are clamped.

The cover 18 can be connected to the flange 14 of the vessel unit 6 in a manner similar to that above-described.

Figure 28:
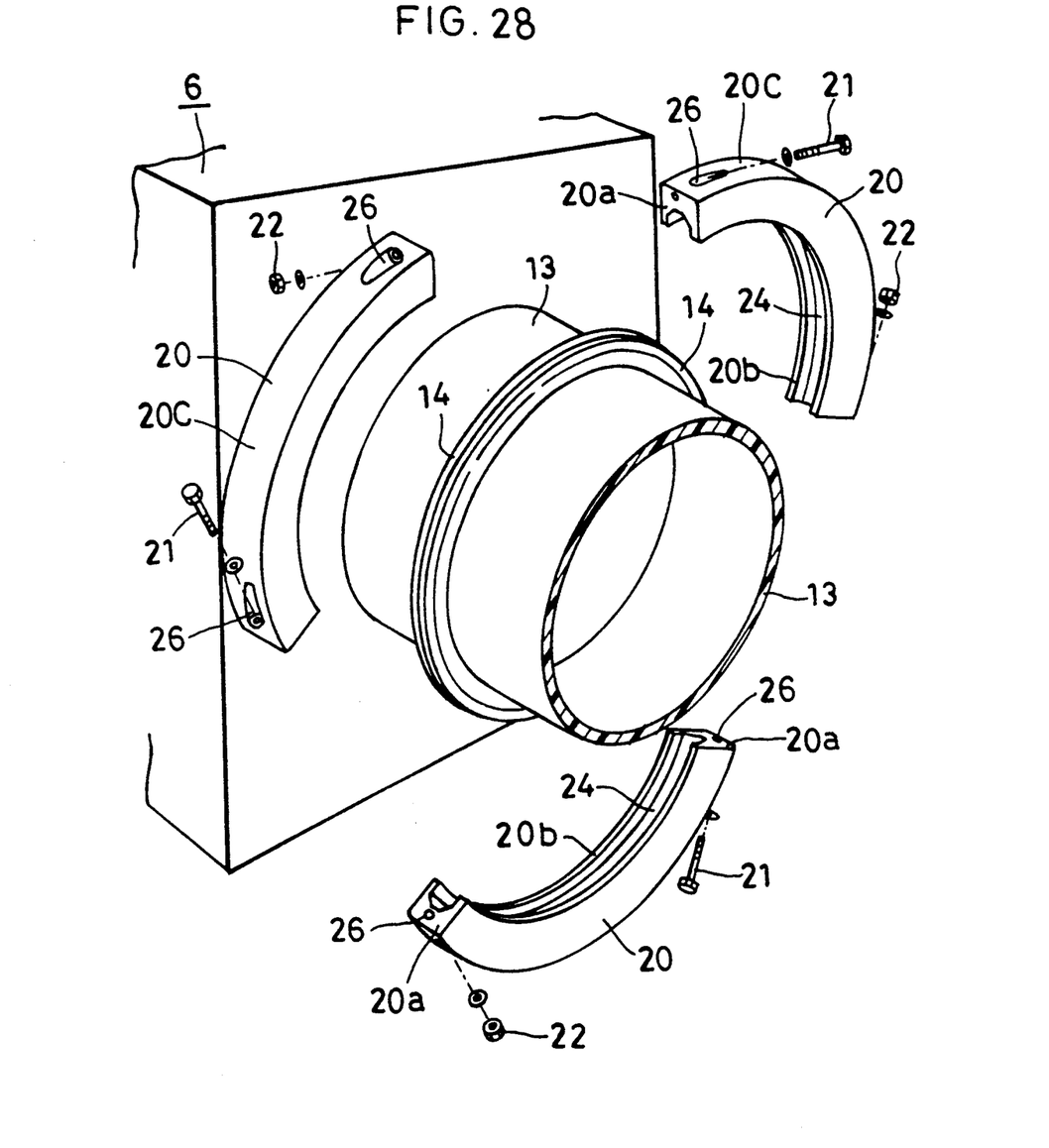
FIG. 28 is a partly broken perspective view exemplifying another connecting means for connecting vessel units.
Figure 29:
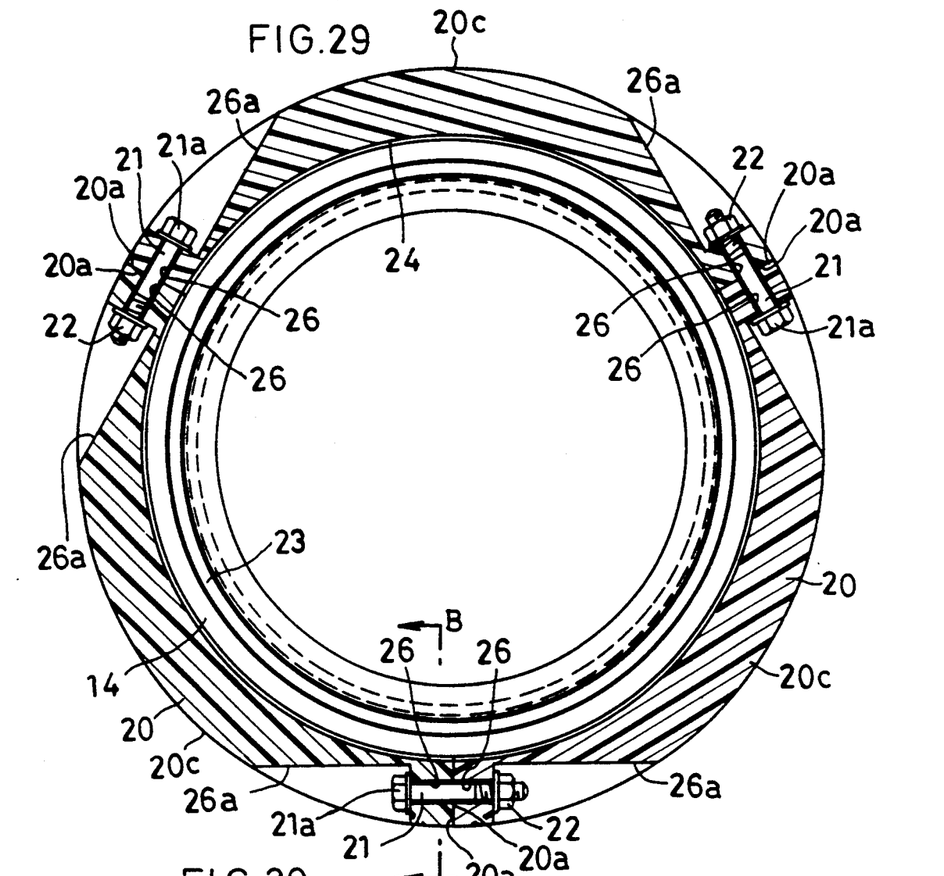
FIG. 29 is a sectional view of a connecting portion shown in FIG. 28.
Figure 30:
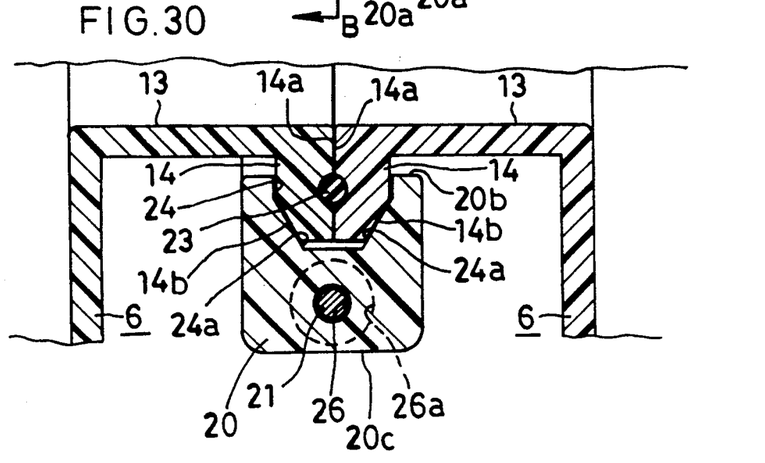
FIG. 30 is an enlarged sectional view of FIG. 29 taken along the B—B line.

FIGS. 28 to 30 exemplify a connecting means for the circular short tube portions 13 and the circular flanges 14 of the vessel units 6.

In this case, the circular flanges 14 of the vessel units 6 are connected to each other with a packing 23 therebetween by utilizing three trisected-circle-shaped circular arc connecting members 20 and three pairs of bolts 21 and nuts 22. Others are similar to FIGS. 25 to 27, and throughout FIGS. 25 to 27 and FIGS. 28 to 30, like parts are designated by like reference numerals.

By utilizing such connecting means as shown in FIGS. 25 to 30, pairs of the flanges 14 of vessel units 6 can be tightly connected even with few bolts and nuts.

Figures 31, 32:
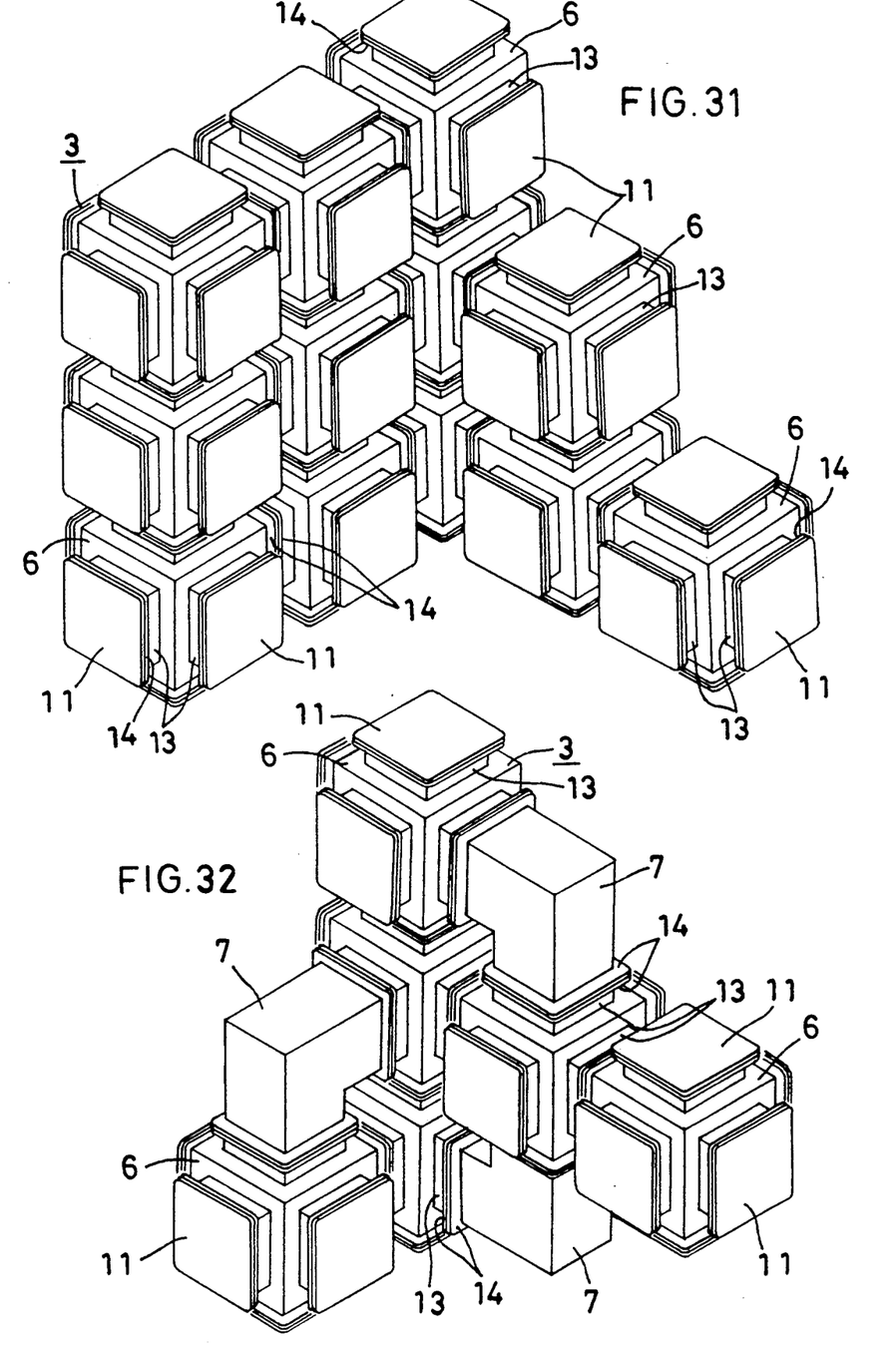
FIG. 31 is a perspective view of a fourth embodiment of the water vessel according to the invention.
FIG. 32 is a perspective view of a fifth embodiment of the water vessel according to the invention.

FIG. 31 shows diagrammatically another example employing such vessel units 6 as shown in FIG. 24. Throughout FIG. 23 and FIG. 31, like parts are designated by like reference numerals.

In this embodiment, the water vessel body 3 consists of a multiplicity of three-dimensionally arranged vessel units 6, wherein the flanges 14 of the neighboring vessel units 6 are connected to each other, and the connecting openings 8 not to be connected to other vessel units 6 are tightly closed with the covers 18. Also in this case, a filter vessel either may be provided separately from the water vessel body 3, or may be integrally built in the vessel units 6.

In the embodiments of FIG. 23 and FIG. 31, the water vessel can be constructed with only one kind of vessel units 6, and shapes and sizes of the vessel in its entirety can be optionally changed by changing the number and location of vessel units.

FIG. 32 shows diagrammatically further another example employing such vessel units 6 as shown in FIG. 24. Throughout FIG. 23 and FIG. 32, like parts are designated by like reference numerals.

Also in this embodiment, the water vessel body 3 consists of a multiplicity of three-dimensionally arranged vessel units 6, wherein the flanges 14 of the neighboring vessel units 6 are connected to each other, and some of the remaining flanges 14 in pairs are connected to each other with L-shaped bent square-tubular connecting vessel units 7. Also in this case, a filter vessel either may be provided separately from the water vessel body 3, or may be integrally built in the vessel units 6.

What is claimed is:

1. A water vessel comprising a multiplicity of vessel units having at least one connecting opening, a short tube portion being formed at each connecting opening of the vessel units, a connecting flange being formed at an end of each short tube portion, an annular packing interposed between contact surfaces of the connecting flanges of an adjacent pair of vessel units, annular recesses in said contact surfaces receiving said packing, a multiplicity of connecting members having grooves arranged around the pair of connecting flanges, said pair of flanges being inserted into said grooves, the pair of flanges being pressed into contact by means for clamping the end portions of the connecting members together with bolts and utilizing wedge action between peripheral wedge portions of the pairs of flanges and groove wedge portions of the connecting members.

2. A water vessel as defined in claim 1, wherein the short tube portion and the connecting flange of each vessel unit are quadrate, the connecting members are substantially rectilinear and corresponds to a side of said quadrate the inward edges of the connecting members being arched in order that the associated pair of flanges are pressed into contact together with substantially uniform pressure while being clamped together.

3. A water vessel comprising a multiplicity of cubic vessel units having a connecting opening at each of six faces, a short tube portion being formed at each connecting opening of the vessel units, a connecting flange being formed at an end of each short tube portion, the connecting flanges of adjacent vessel units being connected together, and an airtight cover being placed on each connecting flange of a vessel unit which is not connected with another vessel unit.

4. A water vessel as defined by claim 3, wherein an annular packing is interposed between contact surfaces of the connecting flanges of adjacent two vessel units, annular recesses in said contact surfaces receive said packing, a multiplicity of connecting members having grooves arranged around each pair of connecting flanges, said pair of flanges being inserted into said grooves, the pair of flanges being pressed into contact by means for clamping the end portions of the connecting members together with bolts and utilizing wedge action between the peripheral wedge portions of the pair of flanges and groove wedge portions of the connection members.

5. A water vessel as defined in claim 4, wherein the short tube portion and the connecting flange of each vessel unit are quadrate, the connecting members are substantially rectilinear and corresponds to a side of said quadrate the inward edges of the connecting members being arched in order that the associated pair of flanges are pressed into contact together with substantially uniform pressure while being clamped together.

6. A water vessel comprising a multiplicity of cubic vessel units having a connecting opening at each of six faces, a short tube portion being formed at each connecting opening of the vessel units, a connecting flange being formed at an end of each short tube portion, the connecting flanges of adjacent vessel units being connected together, certain ones of the flanges of other vessel units being connected in pairs by means of connecting vessel units, and an airtight cover being placed on each connecting flange of a vessel unit which is not connected with another vessel unit.

7. A water vessel as defined in claim 6, wherein an annular packing is interposed between contact surfaces of the connecting flanges of adjacent two vessel units, annular recesses in said contact surfaces receive said packing, a multiplicity of connecting members having grooves arranged around each pair of connecting flanges, said pair of flanges being inserted into said grooves, the pair of flanges being pressed into contact by means for clamping the end portions of the connecting members together with bolts and utilizing wedge action between the peripheral wedge portions of the pair of flanges and groove wedge portions of the connection members.

8. A water vessel as defined in claim 7, wherein the short tube portion and the connecting flange of each vessel unit are quadrate, the connecting members are substantially rectilinear and corresponds to a side of said quadrate the inward edges of the connecting members being arched in order that the associated pair of flanges are pressed into contact together with substantially uniform pressure while being clamped together.

* * * * *